June 16, 1936. W. W. WILLIAMS 2,044,269
LUBRICATING SYSTEM
Filed Nov. 7, 1934
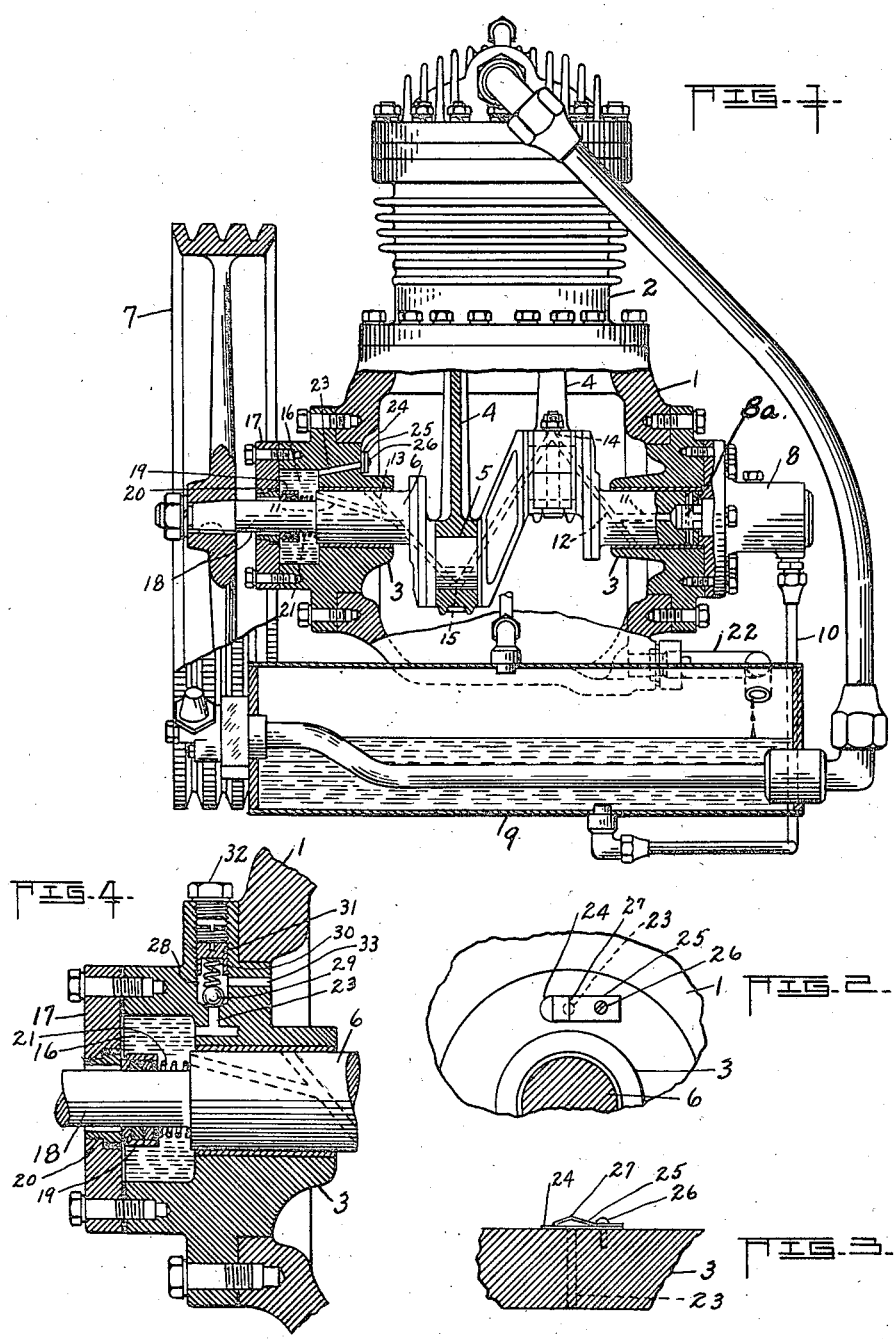
INVENTOR.
WALTER W. WILLIAMS
BY Langdon Moore
ATTORNEY.

Patented June 16, 1936

2,044,269

UNITED STATES PATENT OFFICE 2,044,269

LUBRICATING SYSTEM

Walter W. Williams, Bloomington, Ill.

Application November 7, 1934, Serial No. 751,800

6 Claims. (Cl. 184—6)

This invention relates to improvements in lubricating systems and more particularly to a forced feed lubricating system for crank shaft bearings, and is a continuation in part of this applicant's prior copending application Serial No. 685,020, filed August 14, 1933 which matured into Patent No. 2,012,209, of August 20, 1935.

It is an object of this invention to provide a simple improved efficient lubricating means for shafts such as the crank shafts in compressors, internal combustion engines, compression type refrigerating apparatus and the like.

With these objects in view, reference is made to the accompanying sheet of drawing which illustrates an embodiment of this invention with the understanding that minor detail changes may be made without departing from the scope thereof.

In the drawing:

Figure 1 is a view in side elevation of a compressor of a commercial type of refrigerating apparatus with parts broken away and illustrating in vertical section the bearings of the crank shaft and connecting rods.

Figure 2 is an enlarged fragmentary view illustrating a portion of the interior of the side wall of the compressor and shaft bearing opposite the lubricating pump, and illustrating one form of lubricant relief valve.

Figure 3 is a bottom plan view of the relief valve illustrated in Figure 2.

Figure 4 is a fragmentary enlarged sectional view, illustrating a modified form of lubricant relief valve.

While the embodiment of this invention is illustrated as applied to the crank shaft of the compressor of a refrigerating apparatus such as illustrated and described in this applicant's prior copending application Serial No. 685,020, filed August 14, 1933, it is to be understood that the invention may be applied to crank shafts employed for other purposes and used in other devices, such as internal combustion engines and the like.

The crank case 1, compression cylinder head 2, shaft bearings 3, connecting rods 4, and connecting rod bearings 5 are of the usual standard construction and, therefore, need no detailed description. The crank shaft 6 is provided at one end with a pulley wheel 7 to be driven by a belt from an electric motor, not shown. At the opposite end of the crank case a lubricant pump 8 is mounted upon the outer side of the bearing 3, adapted to be operated by the shaft 6 through a connecting link 8ª. This pump may be of any particular type adapted to draw oil or lubricant from the bottom of the sump 9 through the pipe 10 to the intake side of the pump 8 and discharge the lubricant under pressure through the duct 11 in the shaft 6 having branches 12 and 13 leading to the bearings 3 and having openings 14 and 15 leading to the bearings of the connecting rods 4.

The bearing 3 opposite the oil pump 8 is formed with an exterior recess 16 and a cover plate 17 therefor. The shaft 6, after entering the bottom of the recess 16, is preferably reduced in diameter and extends through the cover plate 17 to support the pulley 7. A stuffing box or rotary seal is provided upon the interior of the plate 17 about the reduced portion 18 of the shaft 6 to provide a liquid seal upon the interior of the recess 16. This stuffing box preferably includes an annular bearing member or seal 19 held in sealed relation with a corresponding bearing member 20 upon the plate 17 by a spring 21 coiled about the reduced shaft 18 between the end of the shaft 6 and the said bearing member 19. The construction, as so far described, is illustrated in the said co-pending application.

The duct 11, in the form of crank shaft shown in Figure 1, is arranged axially of that portion of the shaft 6 received within the bearing 3 mounting the pump 8 and is enlarged adjacent the pump to be connected to the discharge side thereof. The duct 11 traverses the wrist pins or cranks of the shaft 6 and then communicates with the interior of the recess 16 at one side of the reduced portion 18 of the shaft 6.

In the particular embodiment of this invention, lubricant carried over the gaseous refrigerant separates therefrom within the crank case 1 and drains therefrom through drain pipe 22 into the sump 9 which is connected to the suction side of the pump 8 by the pipe 10. It is obvious that in other applications of this invention the pipe 10 could be connected directly to the drain pipe 22, or to some other lubricant collector.

The lubricant is forced by the pump 8 through the duct 11 and branches 13 and 12 to lubricate the main bearings 3 of the shaft 6 and through the openings 14 and 15 to lubricate the bearings of the wrist pins or cranks within the connecting rods 4, and the excess lubricant is then discharged into the recessed chamber 16. The chamber 16 is provided with a relief shown in Figure 1 as including a duct 23 leading therefrom to the interior of the crank case 1, which is provided with a flapper or relief valve 24 upon the interior of the crank case or bearing wall so that, as the pump 8, after forcibly feeding the lubricant to the respective bearings, causes the excess lubricant to fill the recessed chamber 16; the pressure created therein will open the relief valve 24 and allow the excess lubricant to drain to the bottom of the crank case and from thence be drawn to the suction side of the pump for recirculation. The relief valve 24 is shown in detail in Figures 2 and 3 as including a flat spring 25 co-extensive with the valve 24 and secured at one end thereto by a tap screw 26 which also secures the valve 24 to the wall of the bearing member 3. It is preferable to provide the spring with a struck-up portion 27 over the duct 23 to cause the free end of the spring to bear upon the valve on the side of the duct farthest from the tap screw 26.

Figure 4 illustrates a modified form of relief for the chamber 16 in which the duct 23 communicates with an enlarged chamber 28 in the bearing member 3 opening to the exterior of the crank case. The communication between the duct 23 and chamber 28 is controlled by a ball check and relief valve 29 normally held seated by a spring 30 which is adjusted by a screw-threaded plug 31 threaded upon threads provided therefor within the chamber wall 28, which chamber is preferably closed upon the exterior of the crank case 1 by a headed plug 32. The chamber 28 above the ball 29 is provided with a duct 33 communicating with the interior of the crank case 1.

In the latter construction, the flow of the lubricant under pressure from the recessed chamber 16 to the interior of the crank case is controlled by a valve wholly within the bearing member 3, and, therefore, not subjected to the action of any of the gases which may be existent within the crank case 1. Furthermore, the relief valve in this type is readily accessible from the exterior of the crank case and may be readily repaired or adjusted without removing the bearing member 3 from the crank case 1.

The annular bearing member or sealing ring 19 and the corresponding member 20 are of commercial form having lapped contacting surfaces normally held in lapped relation by the spring 21. Experience has proved that in devices of the general character herein described in which a rapid rotation of the shaft is necessary, the sealing ring and contacting member burn out or become defective. This invention contemplates the provision of the recessed chamber 16 about these parts to be filled with lubricant under pressure from the lubricant pump controlled either by the relief valve 24, having a flat or relief spring 25 of predetermined pressure, or by the ball valve 29, adjusted to the desired pressure, controlling the relief passage 23. In accordance with this invention, the pressure of the lubricant in chamber 16 is adjusted so that the pressure not only assists the spring in seating the annular ring 19 upon its contacting member 20, but also provides lubrication for the moving parts of the stuffing box or seal, adding to the life of said members as proper lubrication prevents their becoming defective and provides devices of the character described with more perfect bearing lubrication.

What I claim is:

1. A lubricating system for power-driven shafts including a bearing member enclosing one end of the shaft and mounting a lubricating pump, a bearing member surrounding the other end having a closed recessed chamber about a portion of the shaft, a fluid seal between the shaft and chamber closure, a lubricating duct in the shaft communicating with the discharge side of the pump and said chamber, placing the lubricant in said chamber under sufficient pressure to lubricate said seal, a relief passage controlled by a relief valve leading from said chamber, a lubricant collector into which said relief passage opens, and a lubricant pipe communicating with said collector and the intake side of the pump.

2. The structure of claim 1, wherein the fluid seal includes an annular sealing member mounted upon the shaft, and wherein the pressure of the lubricant within the chamber forces the said member into sealing relation with the sealing member upon the chamber closure.

3. In a power-transmitting device including a driven crank-shaft, a crank case thereabout, bearing members for the shaft provided in the wall of the case, one of the members provided with a closed chamber about the shaft, a stuffing box about the shaft as it passes through the exterior wall of the chamber, a lubricant pump communicating with said chamber to force lubricant therein under pressure sufficient to lubricate the moving parts of the stuffing box and wherein the stuffing box includes a sealing member carried in fixed relation upon the said chamber wall and an annular sealing member about the shaft having lapped relation to the first sealing member, and wherein the pressure of the lubricant within the chamber maintains the lapped relation between said sealing members.

4. The structure of claim 3, wherein the said chamber is provided with a valve controlled relief admitting lubricant to the crank case, and wherein the intake of the pump communicates with the bottom of the crank case.

5. The structure of claim 3, wherein the lubricant pump is mounted upon a bearing member of the shaft to be operated by the rotation of the shaft, and a duct is provided within the shaft to conduct the lubricant to the respective bearings of the shaft and to the said chamber.

6. The structure of claim 3, wherein the said chamber is provided with a valve-controlled relief admitting lubricant to the crank case, and wherein the intake of the pump communicates with the bottom of the crank case, and wherein the pressure of the lubricant within the chamber is regulated by the adjustment of the relief valve.

WALTER W. WILLIAMS.